US012151475B2

(12) United States Patent
Yamanaka

(10) Patent No.: US 12,151,475 B2
(45) Date of Patent: Nov. 26, 2024

(54) HEAD UNIT AND LIQUID DISCHARGE APPARATUS

(71) Applicant: Kentaroh Yamanaka, Kanagawa (JP)

(72) Inventor: Kentaroh Yamanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 202 days.

(21) Appl. No.: 17/831,661

(22) Filed: Jun. 3, 2022

(65) Prior Publication Data

US 2022/0396071 A1 Dec. 15, 2022

(30) Foreign Application Priority Data

Jun. 15, 2021 (JP) ................................ 2021-099480

(51) Int. Cl.
*B41J 2/045* (2006.01)

(52) U.S. Cl.
CPC ....... *B41J 2/04541* (2013.01); *B41J 2/04581* (2013.01); *B41J 2/04588* (2013.01); *B41J 2/04593* (2013.01)

(58) Field of Classification Search
CPC .............................................. B41J 2002/14491
See application file for complete search history.

(56) References Cited

U.S. PATENT DOCUMENTS

2018/0370228 A1* 12/2018 Tamura ...................... B41J 3/30
2019/0351679 A1* 11/2019 Ito ........................ B41J 2/04596
2020/0198330 A1* 6/2020 Uematsu .............. B41J 2/04596
2022/0063266 A1* 3/2022 Kondo ................. B41J 2/04596
2022/0134740 A1* 5/2022 Saito .................... B41J 2/04593 347/10

FOREIGN PATENT DOCUMENTS

JP 2014-200948 10/2014
JP 2015-054465 3/2015
JP 2017-114019 6/2017
JP 2019-005961 1/2019

* cited by examiner

*Primary Examiner* — Shelby L Fidler
(74) *Attorney, Agent, or Firm* — Duft & Bornsen, PC

(57) ABSTRACT

A head unit includes a liquid discharge head, circuitry, and a cable. The liquid discharge head includes multiple piezoelectric elements including multiple individual electrodes and a common electrode. The circuitry generates a first drive signal applied to the multiple individual electrodes, a second drive signal applied to the multiple individual electrodes and having a different waveform from the first drive signal, and a voltage signal applied to the common electrode. The cable connects the liquid discharge head and the circuitry. The cable includes n first wires through which the first drive signal is transmitted, n second wires through which the second drive signal is transmitted, and n third wires through which the voltage signal is transmitted. Here, n is an integer equal to or greater than 2. Each of at least (n−1) third wires is arranged between one of the n first wires and one of the n second wires.

3 Claims, 11 Drawing Sheets

FIG. 8 COMPARATIVE EXAMPLE
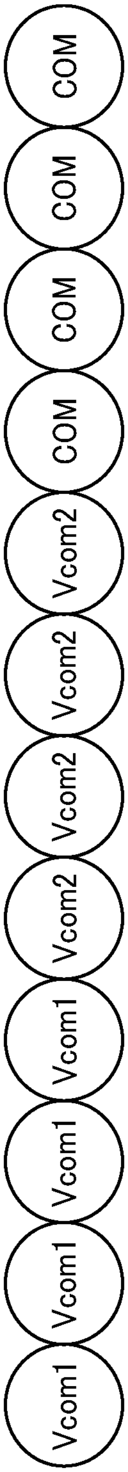
FIG. 9
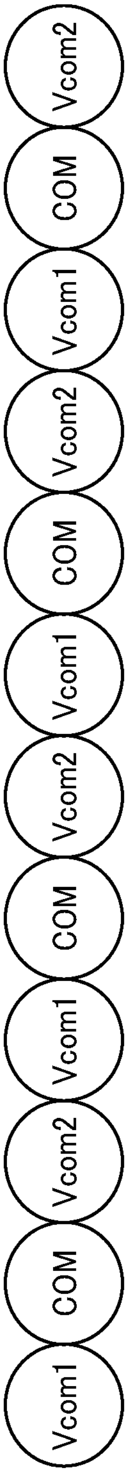
FIG. 10
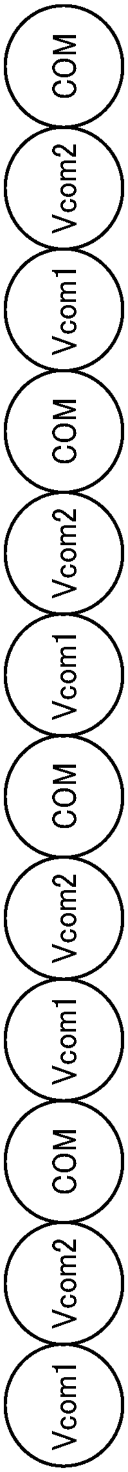

FIG. 13 COMPARATIVE EXAMPLE
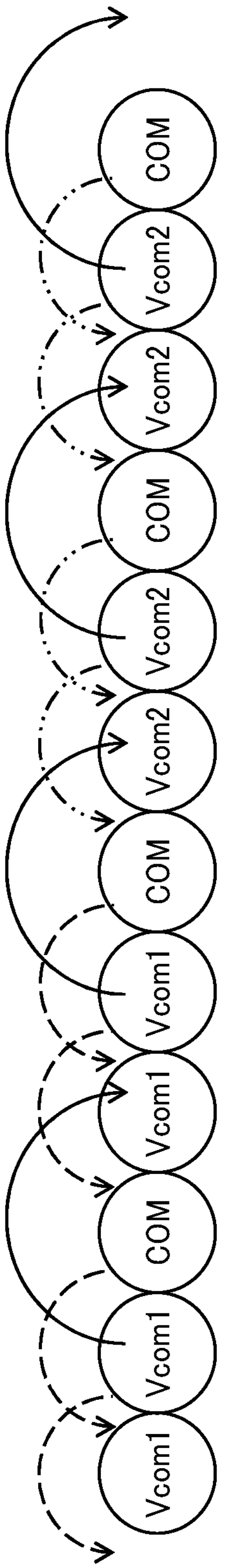
FIG. 14
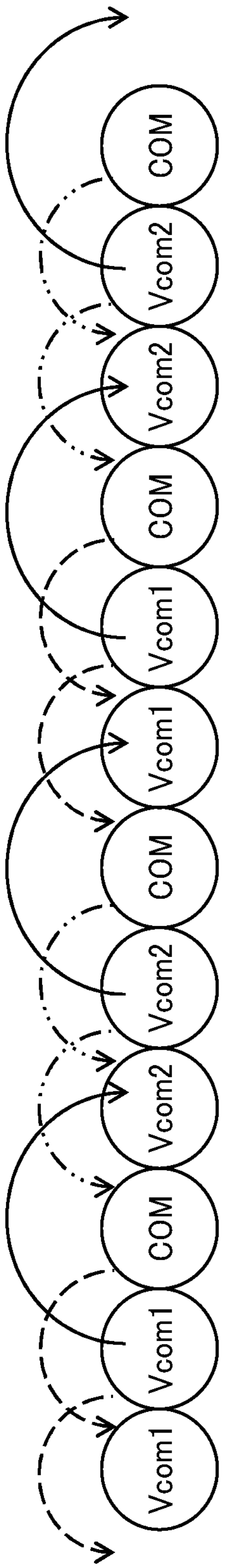
FIG. 15
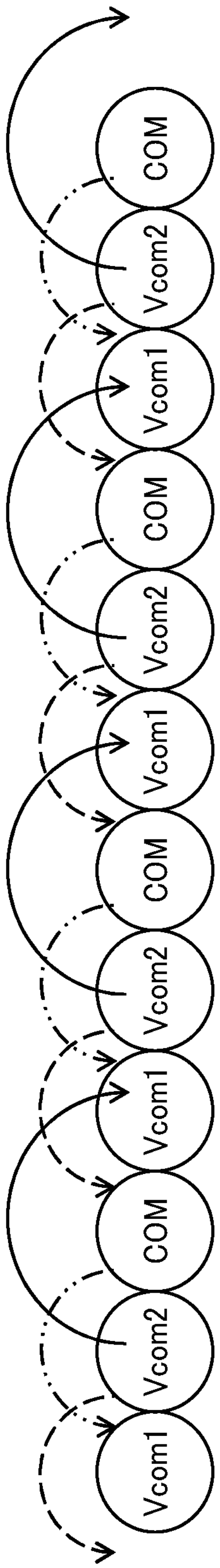

HEAD UNIT AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2021-099480, filed on Jun. 15, 2021, in the Japan Patent Office, the entire disclosure of which is hereby incorporated by reference herein.

BACKGROUND

Technical Field

Aspects of the present disclosure relate to a head unit and a liquid discharge apparatus.

Related Art

A liquid discharge apparatus includes a liquid discharge head and a drive waveform generation unit connected to the liquid discharge head via a cable.

SUMMARY

Embodiments of the present disclosure describes an improved head unit that includes a liquid discharge head, circuitry, and a cable. The liquid discharge head includes multiple piezoelectric elements. The multiple piezoelectric elements include multiple individual electrodes corresponding to the multiple piezoelectric elements, respectively and a common electrode shared by the multiple piezoelectric elements. The circuitry generates a first drive signal applied to the multiple individual electrodes, a second drive signal applied to the multiple individual electrodes and having a different waveform from the first drive signal, and a voltage signal applied to the common electrode. The cable connects the liquid discharge head and the circuitry. The cable includes n first wires through which the first drive signal is transmitted, n second wires through which the second drive signal is transmitted, and n third wires through which the voltage signal is transmitted. Here, n represents the number of wires for each signal and is an integer equal to or greater than 2. Each of at least (n−1) third wires is arranged between one of the n first wires and one of the n second wires.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a cross-sectional diagram of a cable having a wiring arrangement according to a comparative example;

FIG. 9 is a cross-sectional diagram of a cable having a wiring arrangement according to a first embodiment of the present disclosure;

FIG. 10 is a cross-sectional diagram of a cable having a wiring arrangement according to a second embodiment of the present disclosure;

FIG. 13 is a cross-sectional diagram of a cable having a wiring arrangement according to another comparative example for explaining electromagnetic noise generated in the wiring arrangement;

FIG. 14 is a cross-sectional diagram of a cable having a wiring arrangement according to a fourth embodiment of the present disclosure for explaining electromagnetic noise generated in the wiring arrangement; and FIG. 15 is a cross-sectional diagram of the cable having the wiring arrangement according to the second embodiment in FIG. 10 for explaining electromagnetic noise generated in the wiring arrangement.

Figure 1:
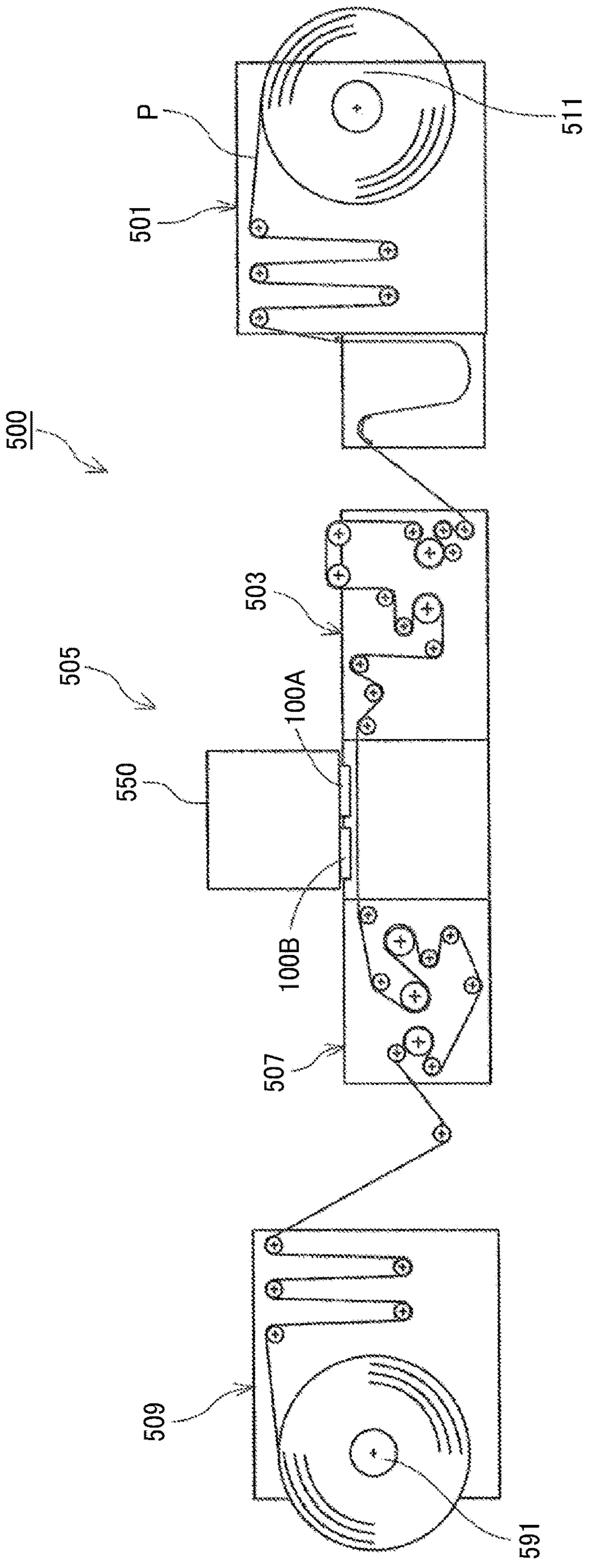
FIG. 1 is a schematic view of a printing apparatus as an example of a liquid discharge apparatus according to embodiments of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected, and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present disclosure are described below with reference to the drawings. It is to be noted that the following embodiments are not limiting the present disclosure and any deletion, addition, modification, change, etc. can be made within a scope in which person skilled in the art can conceive including other embodiments, and any of which is included within the scope of the present disclosure as long as the effect and feature of the present disclosure are exhibited. In each of the drawings, the same reference codes are allocated to components and portions having the same structure or functions, and redundant descriptions thereof may be omitted.

Figure 2:
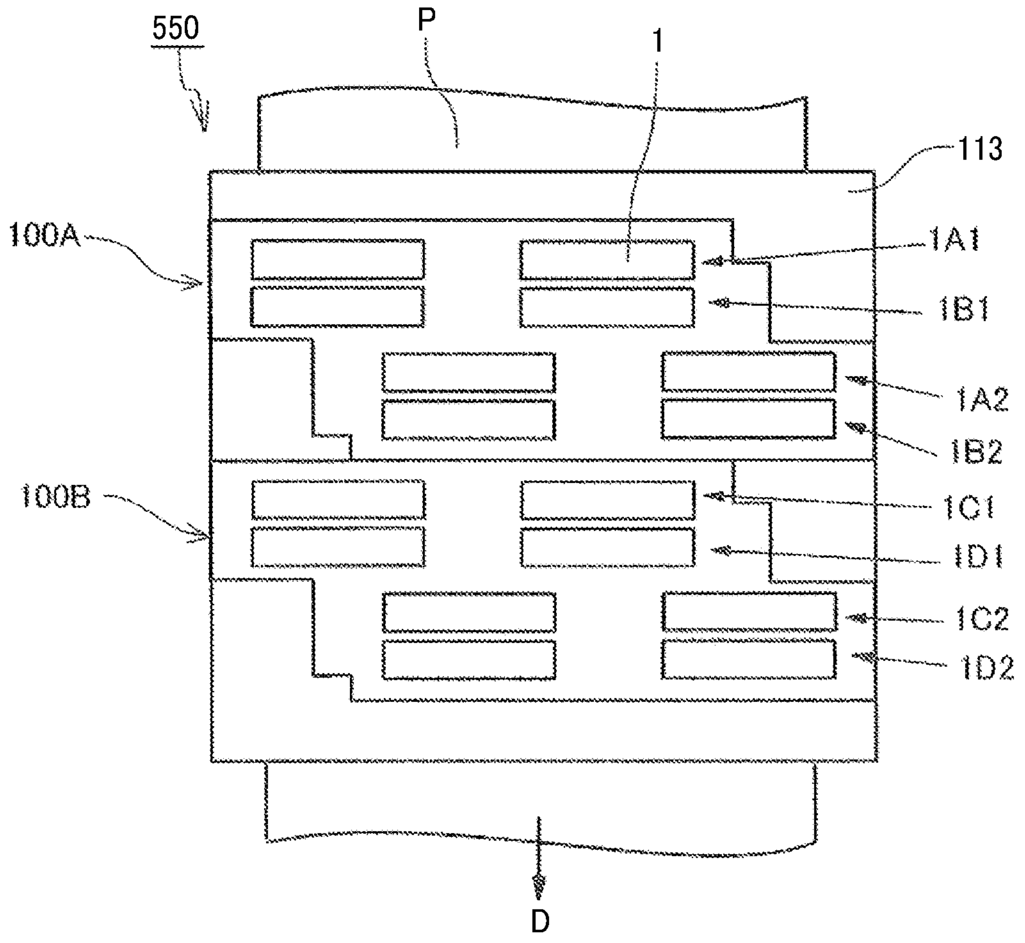
FIG. 2 is a plan view of a head unit of the printing apparatus illustrated in FIG. 1.

A printing apparatus 500 as a liquid discharge apparatus according to an embodiment of the present disclosure is described with reference to FIGS. 1 and 2. FIG. 1 is a schematic view of the printing apparatus 500, and FIG. 2 is a plan view of a head unit 550 of the printing apparatus 500.

The printing apparatus 500 as a liquid discharge apparatus includes a loading device 501, a guide conveyor 503, a printing device 505, a drying device 507, and an ejection device 509. The loading device 501 carries in a web-shaped sheet P. The guide conveyor 503 guides and conveys the sheet P carried in from the loading device 501 to the printing device 505. The printing device 505 discharges liquid onto the sheet P to form (print) an image on the sheet P. The drying device 507 dries the sheet P. The ejection device 509 carries out the sheet P.

The sheet P is fed from a winding roller 511 of the loading device 501, guided and conveyed with rollers of the loading device 501, the guide conveyor 503, the drying device 507, and the ejection device 509, and wound around a winding roller 591 of the ejection device 509. In the printing device 505, the sheet P is conveyed on a conveyance guide so as to face the head unit 550, and the head unit 550 discharges liquid to the sheet P to print an image on the sheet P.

The head unit 550 includes two head modules 100A and 100B on a common base 113. Hereinafter, the two head modules 100A and 100B are referred to as a "head module 100" unless distinguished from each other. The head module 100A includes head arrays 1A1, 1B1, 1A2, and 1B2. Each of the head arrays 1A1, 1B1, 1A2, and 1B2 includes multiple liquid discharge heads 1 arranged in a head array direction perpendicular to a conveyance direction of the sheet P indicated by arrow D in FIG. 2. The head module 100B includes head arrays 1C1, 1D1, 1C2, and 1D2. Each of the head arrays 1C1, 1D1, 1C2, and 1D2 includes multiple liquid discharge heads 1 arranged in the head array direction perpendicular to the conveyance direction of the sheet P. The head arrays 1A1 and 1A2 of the head module 100A discharge liquid of the same color. Similarly, the head arrays 1B1 and 1B2 of the head module 100A are grouped as one set and discharge liquid of the same desired color. The head arrays 1C1 and 1C2 of the head module 100B are grouped as one set and discharge liquid of the same desired color. The head arrays 1D1 and 1D2 of the head module 100B are grouped as one set and discharge liquid of the same desired color.

Figure 3:
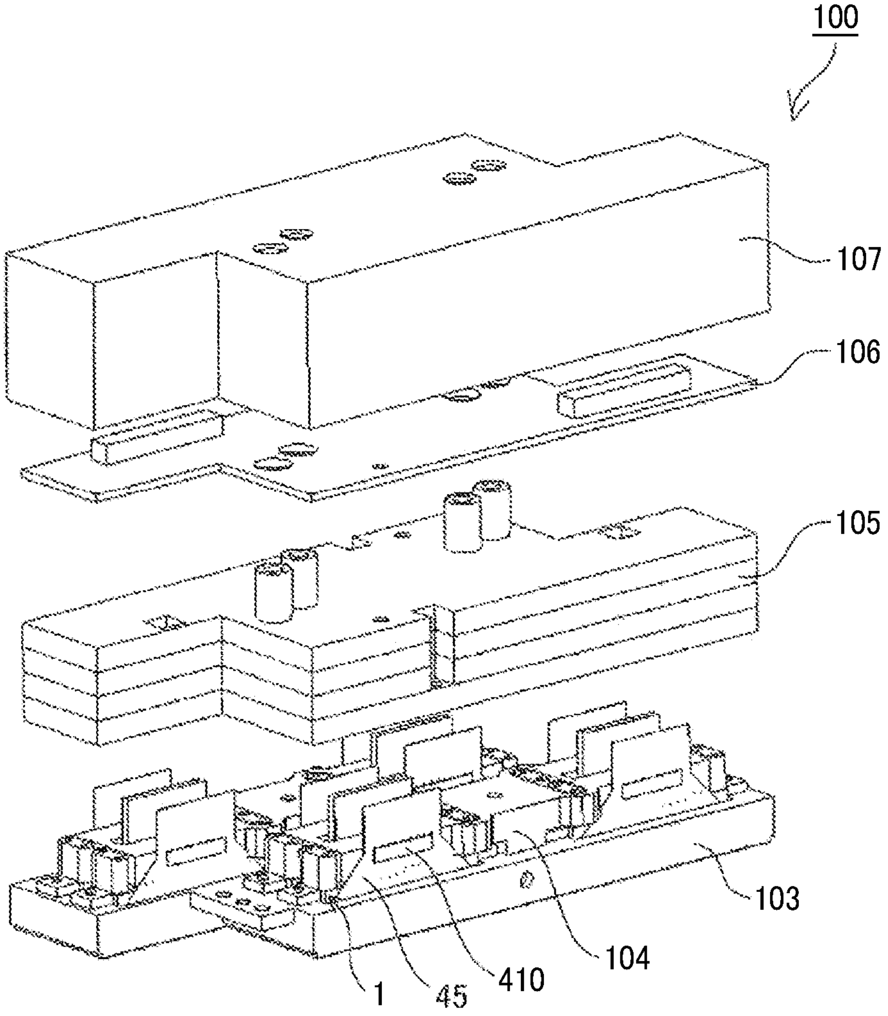
FIG. 3 is an exploded perspective view of a head module of the head unit according to embodiments of the present disclosure.
Figure 4:
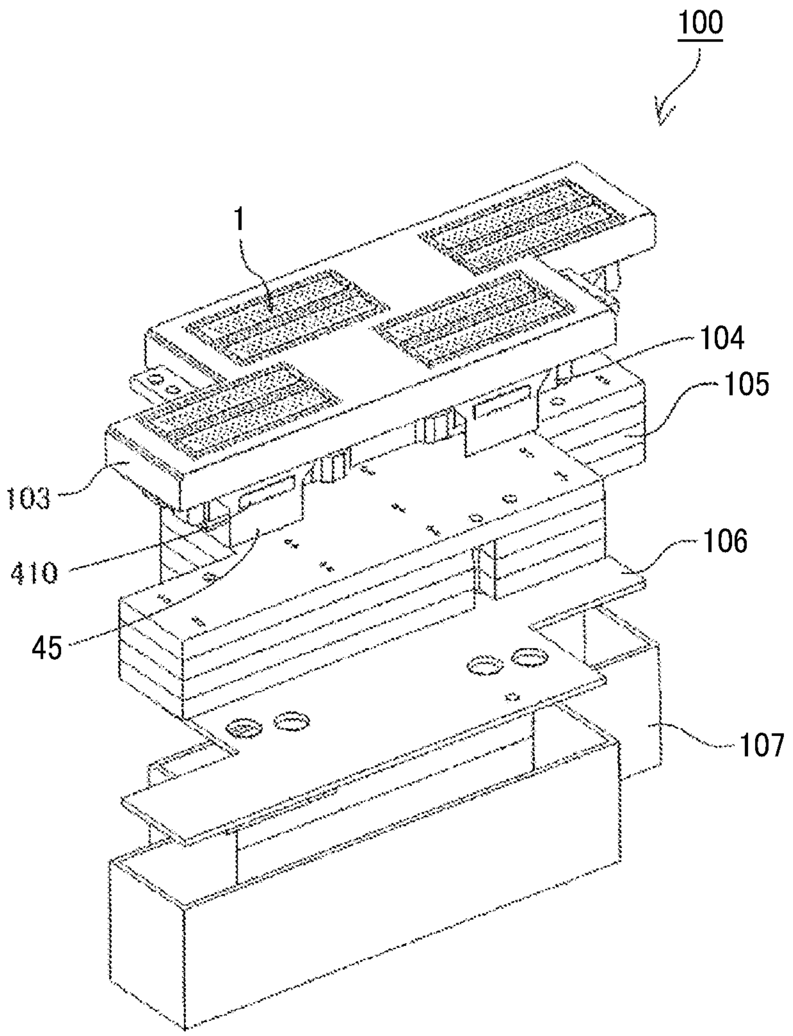
FIG. 4 is an exploded perspective view of the head module viewed from a nozzle surface side thereof.

Next, an example of the head module 100 according to the present embodiment is described with reference to FIGS. 3 and 4. FIG. 3 is an exploded perspective view of the head module 100. FIG. 4 is an exploded perspective view of the head module 100 viewed from a nozzle surface side thereof. The head module 100 includes the multiple liquid discharge heads 1 that discharge liquid, and a base 103 that holds the multiple liquid discharge heads 1. The head module 100 further includes a heat dissipator 104, a manifold 105 defining channels to supply liquid to the multiple liquid discharge heads 1, a printed circuit board (PCB) 106 connected to a cable 45, and a module case 107.

Figure 5:
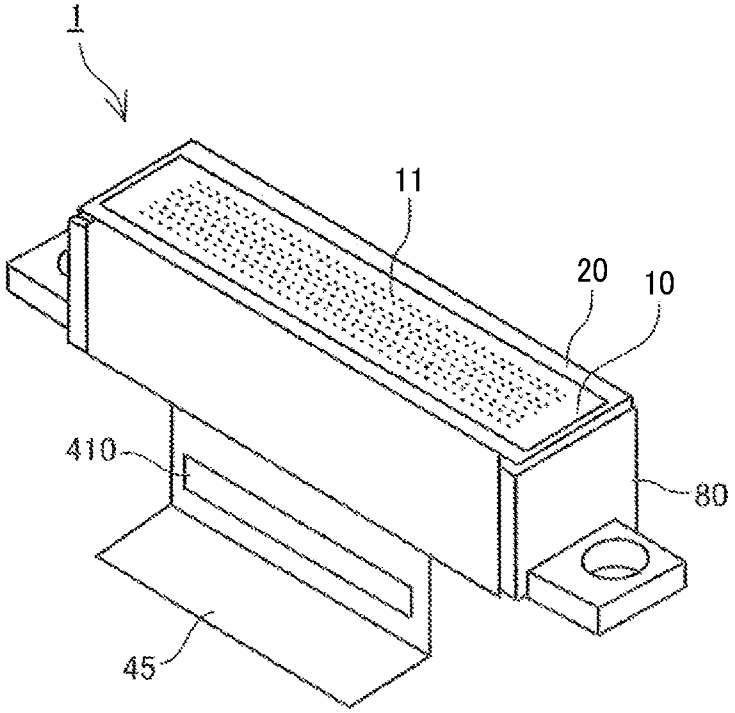
FIG. 5 is an external perspective view of a liquid discharge head of the head module viewed from the nozzle surface side according to embodiments of the present disclosure.

Next, an example of the liquid discharge head 1 is described with reference to FIG. 5. FIG. 5 is an external perspective view of the liquid discharge head 1 viewed from the nozzle surface side according to the present embodiment. The liquid discharge head 1 includes a nozzle plate 10, a channel plate (individual channel substrate) 20, and a frame 80, and is connected to the cable 45. A head driver 410 (e.g., a driver integrated circuit (IC)) is mounted on the cable 45 serving as wiring. The liquid discharge head 1 further includes a diaphragm substrate, a common channel substrate, and the like in the frame 80.

The nozzle plate 10 has multiple nozzles 11 to discharge liquid. The multiple nozzles 11 are arranged in a two-dimensional matrix. The individual channel substrate 20 has multiple pressure chambers respectively communicating with the multiple nozzles 11, and various channels respectively communicating with the multiple pressure chambers. The diaphragm substrate and the nozzle plate 10 are disposed on opposite sides of the individual channel substrate 20. The diaphragm substrate forms a diaphragm serving as a deformable wall of the pressure chamber, and multiple piezoelectric elements are integrally attached to the diaphragm.

The piezoelectric element is a pressure generator to deform the diaphragm to pressurize liquid in the pressure chamber. The multiple piezoelectric elements correspond to the nozzles 11, respectively. Note that the individual channel substrate 20 and the diaphragm substrate are not limited to separated components, and the diaphragm substrate may be a film formed on the surface of the individual channel substrate 20. The common channel substrate defines a flow path through which liquid is supplied to the pressure chamber. Detailed description is omitted here. As the piezoelectric element is driven, the liquid supplied to the pressure chamber is pressurized. Thus, the liquid discharge head 1 discharges the liquid from the nozzle 11.

Figure 6:
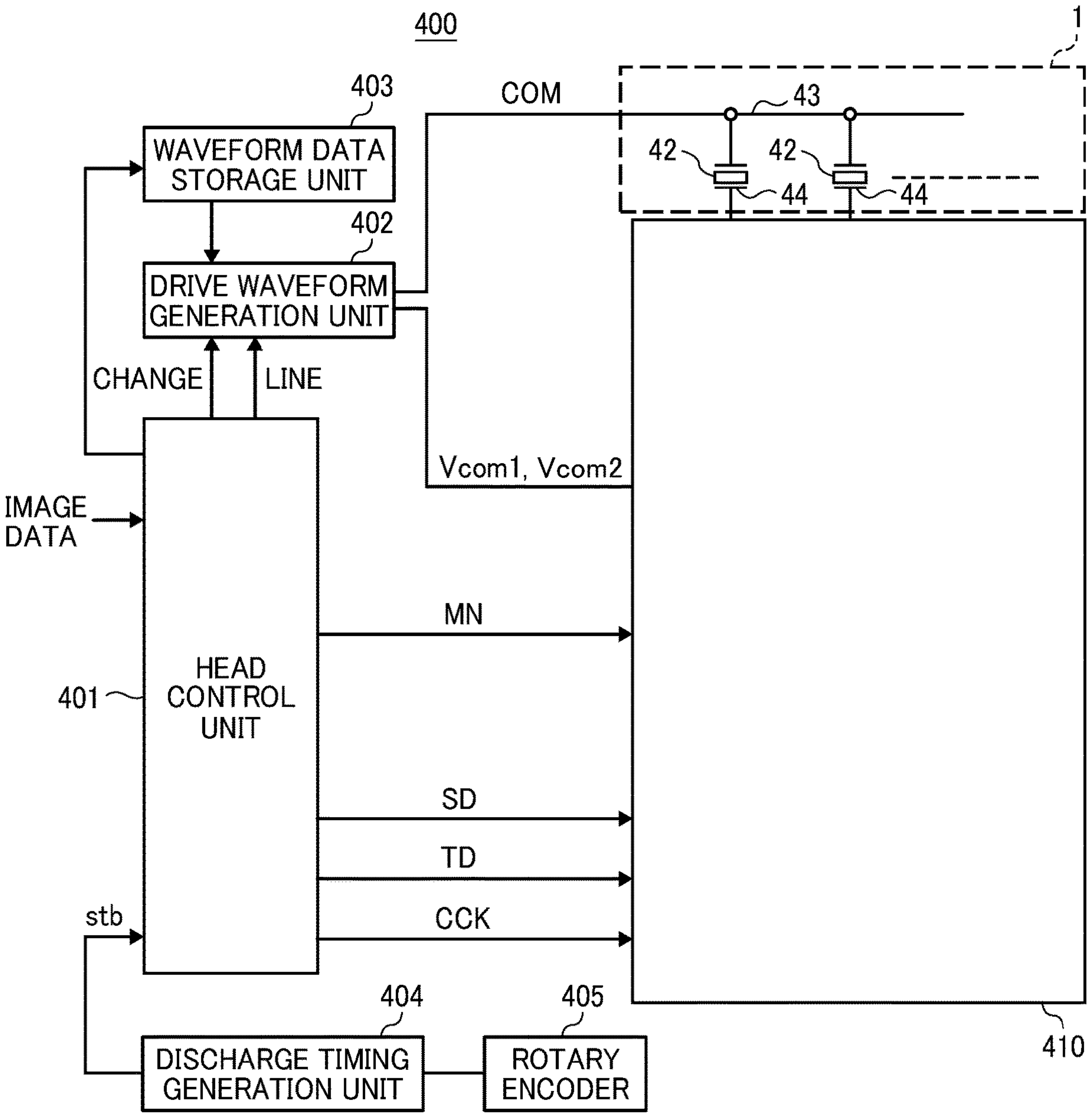
FIG. 6 is a block diagram of a head drive controller of the head unit according to embodiments of the present disclosure.

The head unit 550 includes a head drive controller 400 as circuitry that applies a drive signal to the liquid discharge head 1 to drive the piezoelectric elements. The head drive controller 400 according to the present embodiment is described with reference to FIG. 6. FIG. 6 is a block diagram of the head drive controller 400. The head drive controller 400 includes a head control unit 401, a drive waveform generation unit 402, a waveform data storage unit 403, a discharge timing generation unit 404, and the head driver 410. The discharge timing generation unit 404 generates a discharge timing based on an output of a rotary encoder 405. The head drive controller 400 is formed, for example, in a drive circuit board of the head unit 550 except for the head driver 410. As described above, the head driver 410 is mounted on the cable 45.

In response to a discharge timing pulse stb, the head control unit 401 outputs a discharge synchronization signal LINE, which triggers generation of the drive waveform, to the drive waveform generation unit 402. The head control unit 401 outputs a discharge timing signal CHANGE corresponding to an amount of delay from the discharge synchronization signal LINE, to the drive waveform generation unit 402.

The drive waveform generation unit 402 generates and outputs two or more types of the drive signals and one or more types of voltage signals at a timing based on the discharge synchronization signal LINE and the discharge timing signal CHANGE. FIG. 6 illustrates an example in which the drive waveform generation unit 402 generates two types of drive signals and one type of voltage signal. Specifically, the drive waveform generation unit 402 generates a drive signal Vcom1 having a first drive waveform, a drive signal Vcom2 having a second drive waveform, and a voltage signal COM to apply a bias voltage.

The drive waveform generation unit 402 applies the drive signals Vcom1 and Vcom2 to multiple individual electrodes 44 corresponding to multiple piezoelectric elements 42, respectively, via the head driver 410, and applies the voltage signal COM to a common electrode 43 shared by the multiple piezoelectric elements 42. In other words, the multiple piezoelectric element 42 includes the multiple individual electrodes 44, respectively and the common electrode 43, to which the respective signals are applied by the drive waveform generation unit 402. The piezoelectric element 42 is deformed by a potential difference generated between the common electrode 43 and the individual electrode 44 to deform the diaphragm, thereby pressurizing the liquid in the pressure chamber. The same voltage signal COM is applied to the common electrode 43 of the multiple piezoelectric elements 42 in each liquid discharge head 1 regardless of whether the drive signal Vcom1 or the drive signal Vcom2 is selected.

The head control unit 401 receives image data and generates, based on the image data, a mask signal MN to control whether or not the liquid discharge head 1 discharges liquid from each nozzle 11. The mask signal MN is synchronized with the discharge timing signal CHANGE. The head control unit 401 transmits control signals of trimming data TD, a counter clock signal CCK, and the mask signal MN, and print data SD to the head driver 410.

The head driver 410 selectively inputs the drive signal (the drive signal Vcom1 or the drive signal Vcom2) received from the drive waveform generation unit 402 to the individual electrodes 44 of the piezoelectric elements 42 based on the control signals and the print data SD received from the head control unit 401.

The discharge timing generation unit 404 generates and outputs the discharge timing pulse stb each time the sheet P is conveyed by a predetermined amount, based on a detection result of the rotary encoder 405. The rotary encoder 405 includes an encoder wheel that rotates in accordance with the movement of the sheet P and an encoder sensor that reads slits of the encoder wheel.

In FIG. 6, the liquid discharge head 1 and the drive waveform generation unit 402 of the head drive controller 400 are electrically connected through the cable 45 such as a flat ribbon cable or a flexible flat cable (FFC). The drive signal and the voltage signal generated by the drive waveform generation unit 402 are applied to the individual electrodes 44 and the common electrode 43 of the piezoelectric element 42 in the liquid discharge head 1 through the cable 45, respectively.

The liquid discharge head 1 separates the first drive waveform and the second drive waveform and selects the drive signal to be applied to the piezoelectric element 42 to increase the degree of flexibility in waveform design. For example, the first drive waveform is for discharging a small or medium liquid droplet, and the second drive waveform is for discharging a large liquid droplet. The cable 45 includes three types of wiring (a first wire, a second wire, and a third wire) for transmitting the drive signal Vcom1, the drive signal Vcom2, and the voltage signal COM, respectively.

When the drive signal and the voltage signal are transmitted through the cable 45, crosstalk may occur. In the cable 45, an electromagnetic noise emitted from the drive waveform of the drive signal Vcom1 may affect the drive signal Vcom2, and the waveform of the drive signal Vcom2 may be distorted with the electromagnetic noise. To solve such a problem, the cable according to a first comparative example employs a countermeasure against the electromagnetic noise that a ground wire is interposed between a wire for the drive signal Vcom1 and a wire for the drive signal Vcom2, or a shield line is provided for each wire. However, such a countermeasure may increase the number of wires in the cable or the diameter of the wire, causing an increase in arrangement space and cost.

Therefore, according to the embodiments of the present disclosure, the cable 45 connects the liquid discharge head 1 and the drive waveform generation unit 402 (the head drive controller 400), and includes multiple wires disposed in a predetermined wiring arrangement (the arrangement order of the multiple wires) to prevent the change in the drive waveform due to crosstalk. The signal is transmitted through each of the multiple wires.

As described above, the head unit according to the embodiments of the present disclosure uses two or more types of drive waveforms applied to the piezoelectric element, and the cable connecting the liquid discharge head and the drive waveform generation unit has a wiring arrangement so as to reduce the influence of electromagnetic noise generated between the drive waveforms.

Specifically, the head unit according to the embodiments of the present disclosure includes, for example, a liquid discharge head (the liquid discharge head 1) including multiple piezoelectric elements (the multiple piezoelectric elements 42), circuitry (the drive waveform generation unit 402 of the head drive controller 400), and a cable (the cable 45). The multiple piezoelectric elements include multiple individual electrodes (the multiple individual electrode 44) corresponding to the multiple piezoelectric elements, respectively, and a common electrode (the common electrode 43) shared by the multiple piezoelectric elements. The circuitry generates a first drive signal (Vcom1) applied to the multiple individual electrodes, a second drive signal (Vcom2) applied to the multiple individual electrodes and having a different waveform from the first drive signal, and a voltage signal (COM) applied to a common electrode. The cable connects the liquid discharge head and the circuitry.

The cable includes n first wires through which the first drive signal is transmitted, n second wires through which the second drive signal is transmitted, and n third wires through which the voltage signal is transmitted, where n represents the number of wires for each signal and is an integer equal to or greater than 2. Each of at least (n−1) third wires is arranged between one of the n first wires and one of the n second wires. The reference numerals and codes in the parentheses ( ) corresponds to the configurations illustrated in FIGS. 5 and 6 as an example.

As described above, in the head unit according to the present embodiment, the wire (i.e., the first wire) for the drive signal Vcom1 and the wire (i.e., the second wire) for the drive signal Vcom2 are disposed on both sides of the wire (i.e., the third wire) for the voltage signal COM. As a result, crosstalk caused by mutual induction of the cables can be prevented, thereby improving the discharge properties of the head unit.

Figure 7:
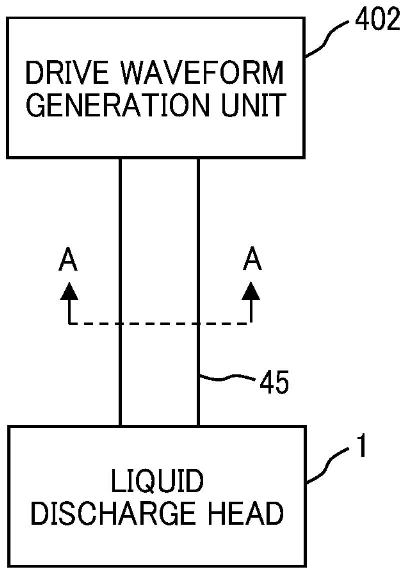
FIG. 7 is a schematic diagram of the liquid discharge head connected to a drive waveform generation unit.

The above-described embodiments of the present disclosure are described below in detail with reference to the drawings. FIG. 7 is a schematic diagram of the liquid discharge head 1 connected to the drive waveform generation unit 402. The cable 45 connects the liquid discharge head 1 and the drive waveform generation unit 402 of the head drive controller 400 in the head unit 550.

Figure 11:
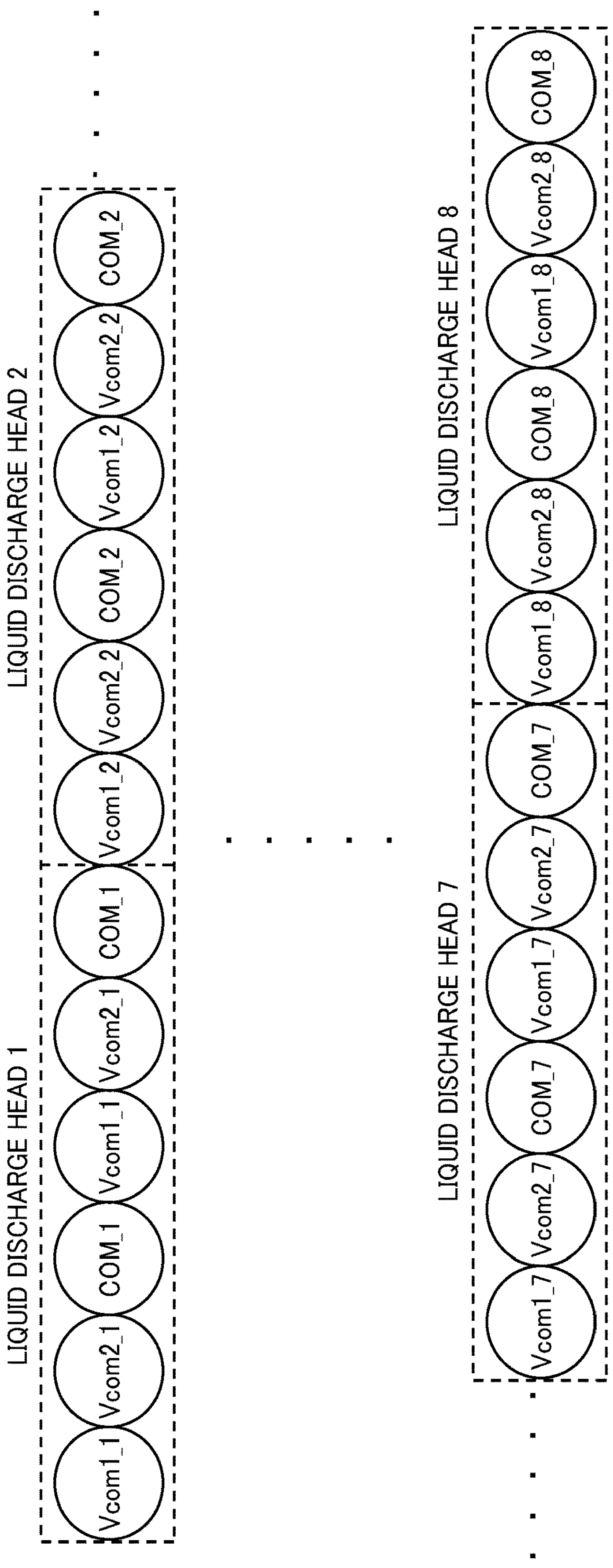
FIG. 11 is a cross-sectional diagram of multiple cables according to a third embodiment of the present disclosure.

With reference to FIGS. 8 to 11, a description is given of examples of wiring arrangements of the cable 45 in cross section taken along line A-A in FIG. 7. FIG. 8 is a cross-sectional diagram of a cable having a wiring arrangement according to a second comparative example. FIG. 9 is a cross-sectional diagram of the cable 45 having a wiring arrangement according to a first embodiment of the present disclosure. FIG. 10 is a cross-sectional diagram of the cable 45 having a wiring arrangement according to a second embodiment of the present disclosure. FIG. 11 is a cross-sectional diagram of the cables 45 having a wiring arrangement according to a third embodiment of the present disclosure.

In the following description, the types of signals (i.e., the first drive signal Vcom1, the second drive signal Vcom2, and the voltage signal COM) are simply referred to as Vcom1, Vcom2, and COM, respectively. In FIGS. 8 to 11, each circle represents one wire, and types of signals transmitted through each wire are indicated in the circle by Vcom1, Vcom2, and COM. The cable illustrated in FIGS. 8 to 10 connects one liquid discharge head 1 and the drive waveform generation unit 402 in the head unit 550. The cable 45 includes multiple wires for Vcom1, multiple wires for Vcom2, and multiple wires for COM. The number of the wires is the same for Vcom1, Vcom2, and COM, that is, the ratio of the number of the wires for Vcom1:Vcom2:COM=1:1:1.

In the second comparative example illustrated in FIG. 8, the wires for Vcom1, the wires for Vcom2, and the wires for COM are grouped for each signal to simplify the substrate design and wiring arrangement of the liquid discharge head 1. However, the wiring arrangement illustrated in FIG. 8 may causes the influence of electromagnetic noise to increase.

FIG. 9 illustrates the wiring arrangement of the cables 45 according the first embodiment. When the number of wires is the same for signals of Vcom1, Vcom2, and COM, the influence of the electromagnetic noise is minimized with the wiring arrangement illustrated in FIG. 9. Specifically, the cable 45 includes a plurality of wiring groups in each of which the wire for Vcom1 (i.e., the first wire), the wire for COM (i.e., the third wire), and the wire for Vcom2 (i.e., the second wire) are arranged in this order. In this wiring arrangement, when the number of wires is n for each signal of Vcom1, Vcom2, and COM (n is an integer equal to or greater than 2), each of the n wires for COM is arranged between the wire for Vcom1 and the wire for the Vcom2 (n=4 in FIG. 9). As described above, the wire for Vcom1 and the wire for Vcom2 are arranged on both sides of the wire COM to reduce the influence of electromagnetic noise caused by mutual induction between the wires.

In addition to the wiring arrangement illustrated in FIG. 9, when the number of wires is n for each signal of Vcom1, Vcom2, and COM, the wiring arrangement illustrated in FIG. can attain similar effects, in which each of the (n−1) wires for COM is arranged between the wire for Vcom1 and the wire for Vcom2. FIG. 10 illustrates the wiring arrangement of the cable 45 according to the second embodiment. The cable 45 includes a plurality of wiring groups in each of which the wire for Vcom1, the wire for Vcom2, and the wire for COM are arranged in this order. Since the wire for COM is arranged at the right end of the cable 45 in FIG. 10, each of the (n−1) wires for COM is arranged between the wire for Vcom1 and the wire for Vcom2 (n=4 in FIG. 10), which is different from the wiring arrangement in FIG. 9.

In the wiring arrangement of the cable 45 illustrated in FIG. 10, the wiring group, in which the wire for Vcom1 having the first drive waveform, the wire for Vcom2 having the second drive waveform, and the wire for COM applied to the common electrode 43 are arranged in this order, is arranged multiple times in the cable 45, so that the wire for Vcom1 through which the first drive waveform is transmitted and the wire for Vcom2 through which the second drive waveform is transmitted are arranged on both sides of the wire for COM through which the voltage applied to the common electrode 43 is transmitted, thereby reducing the influence of crosstalk.

FIG. 11 illustrates the wiring arrangements of the cables 45 when the head unit 550 includes multiple liquid discharge heads 1. The multiple cables 45 are provided for the multiple liquid discharge heads 1, respectively. In FIG. 11, the number of the wires is 2 (n=2) for each signal of Vcom1, Vcom2, and COM (the total number of the wires is 6) in the one cable 45, that is, the ratio of the number of the wires for Vcom1:Vcom2:COM=1:1:1.

The head unit 550 includes a head module including m liquid discharge heads 1 (m is an integer equal to or greater than 2). In FIG. 11, one head module includes eight (m=8) liquid discharge heads 1, and the m liquid discharge heads 1 are distinguished by an identifier "_m." For example, the first drive signal of the first liquid discharge head 1 is represented by Vcom1_1, and the first drive signal of the eighth liquid discharge head 1 is represented by Vcom1_8. The same applies to Vcom2 and COM.

In the head module, two types of drive signals and one type of voltage signal which are different for each liquid discharge head 1 are applied to each liquid discharge head 1. In the head module into which the multiple liquid discharge heads 1 are assembled, the cable 45, for example, having the wiring arrangement illustrated in FIG. 10 is defined as one block, and multiple blocks of cables are aligned for the multiple liquid discharge heads 1, respectively. In other words, m cables 45 connect m liquid discharge heads 1 and the head drive controller 400, and m different types of signals of Vcom1, Vcom2, and COM generated by the drive waveform generation unit 402 (the head drive controller 400) are applied to the m liquid discharge heads 1 through the m cables, respectively. With such a configuration, the electromagnetic noise between the multiple liquid discharge heads 1 can be reduced, thereby minimizing crosstalk caused by mutual induction when the multiple liquid discharge heads 1 are assembled into the head module.

Next, the reason why the influence of electromagnetic noise is reduced is described. When one type of drive waveform such as Vcom1 and COM is used, currents in the wire for Vcom1 and the wire for COM flow in directions opposite to each other in the cable, and magnetic fields are generated by the currents in the directions opposite to each other according to right-handed screw rule. In this case, the wire for Vcom1 and the wire for COM are twisted into a twisted pair to cancel the magnetic fields each other, thereby reducing the influence of the electromagnetic noise over the outside of the cable.

Figure 12:
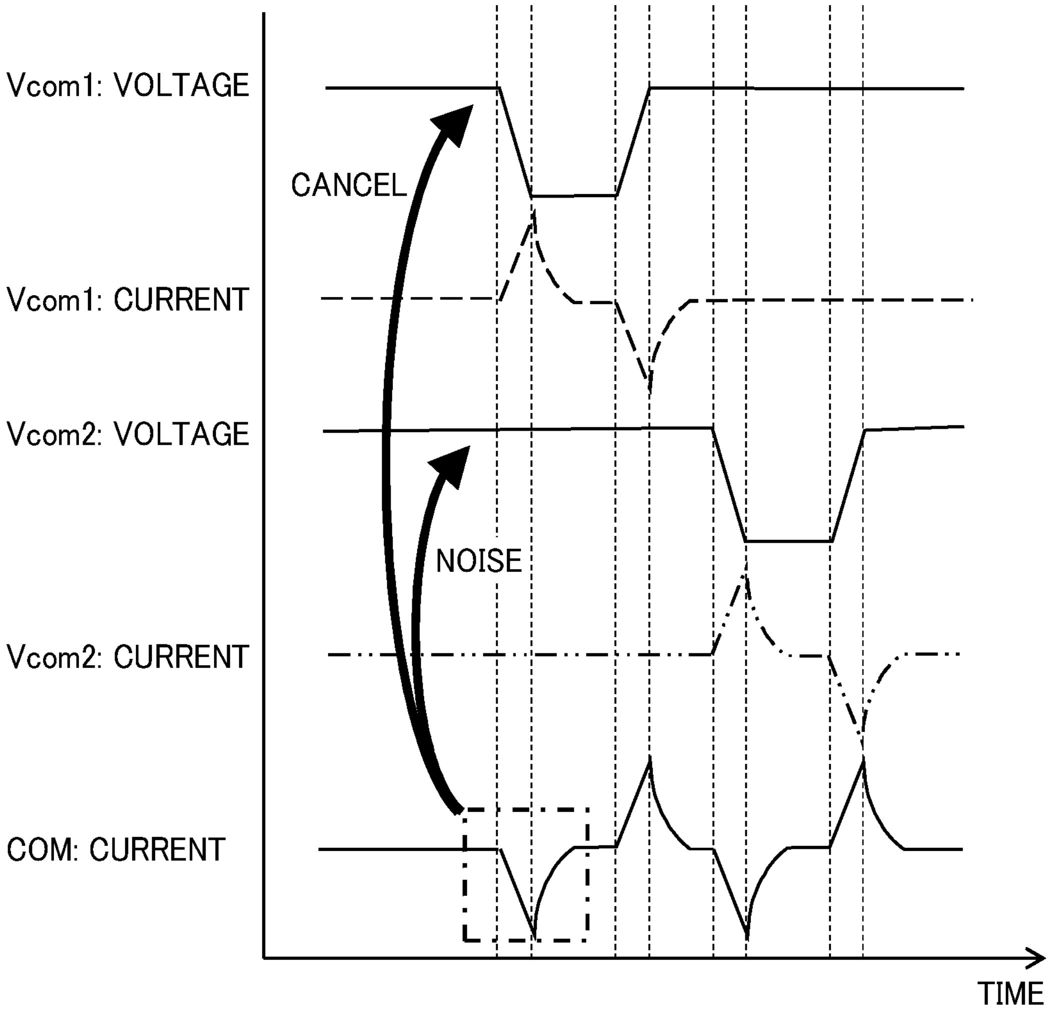
FIG. 12 is a graph illustrating a relation of current among two drive signals and a voltage signal in the head unit.

On the other hand, in the head unit 550 according to the present embodiment, currents in the wire for Vcom1 and the wire for Vcom2 flows together into the wire for COM through the common electrode 43. Since the currents flowing in the wire for Vcom1 and the wire for Vcom2 are different from each other, the magnetic field is not completely canceled even if the wire for Vcom1 and the wire for Vcom2 are twisted with the wire for COM into the twisted pair. FIG. 12 illustrates a relation among the voltage and current of Vcom1, the voltage and current of Vcom2, and the current of COM. In FIG. 12, the current of Vcom1 is indicated by the dashed line, the current of Vcom2 is indicated by the dashed double-dotted line, and the others are indicated by solid lines.

Since the currents in the wire for Vcom1 and the wire for Vcom2 flows together into the wire for COM, the current of COM flows in the opposite direction of the currents of Vcom1 and Vcom2. Although the current of COM corresponding to the current of Vcom1, which is enclosed by the dashed dotted line in the lower left portion of FIG. 12, can cancel the influence of the current of Vcom1, the current of COM does not cancel the influence of the current of Vcom2, causing the electromagnetic noise. When the ratio of the number of wires for Vcom1, Vcom2, and COM is 1:1:1 and the number of the wires is equal to or greater than 2 for each signal of Vcom1, Vcom2, and COM, the influence of electromagnetic noise varies depending on the order of the wires (i.e., the wiring arrangement).

The influence of electromagnetic noise is described below with reference to FIGS. 13 to 15. FIGS. 13 to 15 illustrate the wiring arrangement in which the number of wires n is 4 for each signal of Vcom1, Vcom2, and COM. A magnetic field generated by the current of Vcom1 is indicated by the dashed line, a magnetic field generated by the current of Vcom2 is indicated by the dashed double-dotted line, and a magnetic field generated by the current of COM is indicated by the solid line in FIGS. 13 to 15.

FIG. 13 is a cross-sectional diagram of the cable for explaining the influence of electromagnetic noise generated in the wiring arrangement according to a third comparative example. FIG. 13 illustrates the wiring arrangement in which the wires for the respective signals are arranged in the order of the wires for Vcom1, Vcom1, COM, Vcom1, Vcom1, COM, Vcom2, Vcom2, COM, Vcom2, Vcom2, and COM. The wire for Vcom1 on the left side in FIG. 13 does not cancel the influence of electromagnetic noise emitted from the wire for COM caused by the current of Vcom2, thereby increasing the influence of electromagnetic noise. Similarly, the wire for Vcom2 on the right side in FIG. 13 does not cancel the influence of electromagnetic noise emitted from the wire for COM caused by the current of Vcom1, thereby increasing the influence of electromagnetic noise.

FIG. 14 is a cross-sectional diagram of the cable for explaining the influence of electromagnetic noise generated in the wiring arrangement according to a fourth embodiment of the present disclosure. FIG. 14 illustrates the wiring arrangement in which the wires for the respective signals are arranged in the order of the wires for Vcom1, Vcom1, COM, Vcom2, Vcom2, COM, Vcom1, Vcom1, COM, Vcom2, Vcom2, COM. Since the three wires for COM are disposed between the wire for Vcom1 and the wire for Vcom2, a portion of the magnetic field from the wire for COM that can be canceled increases, thereby reducing the influence of electromagnetic noise. In the experiment, the influence of electromagnetic noise is smaller in the fourth embodiment than in the third comparative example.

FIG. 15 is a cross-sectional diagram of the cable for explaining the influence of electromagnetic noise generated in the wiring arrangement according to the second embodiment illustrated in FIG. 10. FIG. 15 illustrates the wiring arrangement in which the wires for the respective signals are arranged in the order of the wires for Vcom1, Vcom2, COM, Vcom1, Vcom2, COM, Vcom1, Vcom2, COM, Vcom1, Vcom2, COM. The wire for Vcom1 is likely to be affected by the magnetic field from the wire for Vcom2 because the wire for Vcom2 is disposed adjacent to one side of the wire for Vcom1. However, since the wire for COM is also disposed adjacent to the other side of the wire for Vcom1, the magnetic field from the wire for Vcom2 is canceled by the magnetic field generated by the current of COM that flows from the wire for Vcom2, thereby reducing the influence of electromagnetic noise. The same description applies to the wire for Vcom2. In the experiment, the influence of electromagnetic noise is smaller in the second embodiment than in the fourth embodiment.

As described above, in the head unit according to the embodiments of the present disclosure, a predetermined wiring arrangement (e.g., the wire for COM is arranged between the wire for Vcom1 and the wire for Vcom2) of the cable prevents crosstalk when the number of wires for Vcom1, Vcom2, and COM is the same (the number of wires for Vcom1:Vcom2:COM=1:1:1). Accordingly, for example, since the number of wires for Vcom1, Vcom2, and COM is the same, the head unit according to the present embodiments can save space as compared with a comparative head unit having a wiring arrangement in which the number of wires for Vcom1:Vcom2:COM=1:1:2.

In the present disclosure, the liquid to be discharged is not limited to a particular liquid as long as the liquid has a viscosity or surface tension to be discharged from a head (liquid discharge head). However, preferably, the viscosity of the liquid is not greater than mPa·s under ordinary temperature and ordinary pressure or by heating or cooling. Examples of the liquid include a solution, a suspension, or an emulsion including, for example, a solvent, such as water or an organic solvent, a colorant, such as dye or pigment, a functional material, such as a polymerizable compound, a resin, or a surfactant, a biocompatible material, such as DNA, amino acid, protein, or calcium, and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

Examples of an energy source for generating energy to discharge liquid include a capacitive actuator in addition to a piezoelectric actuator (a laminated piezoelectric element or a thin-film piezoelectric element).

Examples of the "liquid discharge apparatus" include, not only apparatuses capable of discharging liquid on materials onto which liquid can adhere, but also apparatuses to discharge liquid toward gas or into liquid.

The "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional apparatus to discharge fabrication liquid to a powder layer in which powder material is formed in layers, so as to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" represents a material onto which liquid is at least temporarily adhered, a material on which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, and ceramic.

The liquid discharge apparatus may be an apparatus to relatively move the head and the material onto which liquid can adhere. However, the liquid discharge apparatus is not limited to such an apparatus. For example, the liquid discharge apparatus may be a serial head apparatus that moves the head or a line head apparatus that does not move the head.

Examples of the liquid discharge apparatus further include: a treatment liquid applying apparatus that discharges treatment liquid onto a paper sheet to apply the treatment liquid to the surface of the paper sheet, for reforming the surface of the paper sheet; and an injection granulation apparatus that injects composition liquid, in which a raw material is dispersed in a solution, through a nozzle to granulate fine particle of the raw material.

The terms "image formation," "recording," "printing," "image printing," and "fabricating" used in the present embodiments may be used synonymously with each other.

As described above, according to the present disclosure, the cable having a predetermined wiring arrangement (e.g., the third wire is arranged between the first wire and the second wire) prevents a change in a drive waveform due to crosstalk.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A head unit comprising:

a liquid discharge head including multiple piezoelectric elements including:

multiple individual electrodes corresponding to the multiple piezoelectric elements, respectively; and a common electrode shared by the multiple piezoelectric elements;

circuitry configured to generate a first drive signal applied to the multiple individual electrodes, a second drive signal applied to the multiple individual electrodes and having a different waveform from the first drive signal, and a voltage signal applied to the common electrode; and a cable connecting the liquid discharge head and the circuitry, the cable including n first wires through which the first drive signal is transmitted, n second wires through which the second drive signal is transmitted, and n third wires through which the voltage signal is transmitted, where n represents a number of wires for each signal and is an integer equal to or greater than 2, where each of at least n−1 first wires has one side thereof adjacent to a third wire, where each of at least n−1 first wires has another side thereof adjacent to a second wire, where each of at least n−1 second wires has a side thereof adjacent to a third wire, wherein the liquid discharge head includes m liquid discharge heads, and the cable includes m cables connecting the m liquid discharge heads and the circuitry, respectively, where m is an integer equal to or greater than 2, and wherein the first drive signal includes m different types of first drive signals, the second drive signal includes m different types of second drive signals, and the voltage signal includes m different types of voltage signals, each of which applied to the m liquid discharge heads, respectively.

2. The head unit according to claim 1, wherein the cable includes a plurality of wiring groups in each of which one of the n first wires, one of the n second wires, and one of the n third wires are arranged in this order.

3. A liquid discharge apparatus comprising the head unit according to claim 1.

* * * * *